(12) United States Patent
Sun et al.

(10) Patent No.: US 11,671,209 B2
(45) Date of Patent: *Jun. 6, 2023

(54) METHOD AND APPARATUS FOR DETERMINING HARQ TIMING IN COMMUNICATION SYSTEMS

(71) Applicant: NEC Corporation, Tokyo (JP)

(72) Inventors: Zhennian Sun, Beijing (CN); Gang Wang, Beijing (CN); Ming Lei, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,299

(22) Filed: Oct. 25, 2021

(65) Prior Publication Data

US 2022/0116154 A1 Apr. 14, 2022

Related U.S. Application Data

(63) Continuation of application No. 16/657,778, filed on Oct. 18, 2019, now Pat. No. 11,201,700, which is a
(Continued)

(51) Int. Cl.
*H04L 5/14* (2006.01)
*H04L 1/1829* (2023.01)
*H04W 72/23* (2023.01)

(52) U.S. Cl.
CPC ............. *H04L 1/1854* (2013.01); *H04L 5/14* (2013.01); *H04W 72/23* (2023.01)

(58) Field of Classification Search
None
See application file for complete search history.

(56) References Cited

U.S. PATENT DOCUMENTS 9,014,065 B2 * 4/2015 Yang ..................... H04W 72/23
370/294
9,191,180 B2 11/2015 Seo et al.
(Continued)

FOREIGN PATENT DOCUMENTS

CN 101841405 A 9/2010
CN 101964698 A 2/2011
(Continued)

OTHER PUBLICATIONS

Notification of Reasons for Refusal issued by the Japanese Patent Office in counterpart Japanese Patent Application No. 2016-197811 dated Oct. 3, 2017.
(Continued)

*Primary Examiner* — Ajit Patel

(57) ABSTRACT

Methods and apparatuses for determining HARQ timing in a communication system supporting Carrier Aggregation (CA) are provided. A method for receiving, at a BS, a HARQ feedback from a UE in a communication system supporting CA of a Pcell and at least one Scell is provided. The Pcell and Scell support either FDD or TDD. The method comprises: transmitting a downlink physical channel through one of the Pcell and Scell; receiving the HARQ feedback corresponding to the downlink physical channel of the Pcell at a first timing predetermined for the Pcell; and receiving the HARQ feedback corresponding to the downlink physical channel of the Scell at a second timing. The second timing is determined according to one or more of duplex modes of the Pcell and the Scell, a scheduling mode of the Scell, and predefined rules.

18 Claims, 8 Drawing Sheets

Related U.S. Application Data continuation of application No. 15/844,143, filed on Dec. 15, 2017, now Pat. No. 10,484,145, which is a continuation of application No. 14/772,296, filed as application No. PCT/CN2013/073335 on Mar. 28, 2013, now Pat. No. 9,882,681.

(56) References Cited

U.S. PATENT DOCUMENTS

| | | | |
|---|---|---|---|
| 2005/0094776 | A1 | 5/2005 | Haldeman et al. |
| 2012/0213129 | A1 | 8/2012 | Jang et al. |
| 2012/0213170 | A1 | 8/2012 | Choi et al. |
| 2012/0307689 | A1 | 12/2012 | Kim et al. |
| 2013/0034028 | A1 | 2/2013 | Chen et al. |
| 2013/0039231 | A1* | 2/2013 | Wang .......... H04W 72/10 370/280 |
| 2013/0070652 | A1 | 3/2013 | Li et al. |
| 2013/0294423 | A1* | 11/2013 | Wang .......... H04W 52/0219 370/336 |
| 2013/0315135 | A1 | 11/2013 | Lee et al. |
| 2013/0322307 | A1 | 12/2013 | Yang et al. |
| 2013/0336267 | A1 | 12/2013 | Li et al. |
| 2013/0343239 | A1 | 12/2013 | Damnjanovic et al. |
| 2014/0078941 | A1* | 3/2014 | Seo .......... H04L 1/1893 370/280 |
| 2014/0119246 | A1 | 5/2014 | Yin et al. |
| 2014/0334395 | A1 | 11/2014 | Lee et al. |
| 2015/0055519 | A1 | 2/2015 | Lin et al. |
| 2015/0207594 | A1 | 7/2015 | Si et al. |
| 2015/0295681 | A1 | 10/2015 | Liang et al. .......... H04J 4/00 370/280 |
| 2016/0204906 | A1 | 7/2016 | Cheng et al. |

FOREIGN PATENT DOCUMENTS

| | | | |
|---|---|---|---|
| CN | 102075949 A | 5/2011 | |
| CN | 102651680 A | 8/2012 | |
| CN | 102769826 A | 11/2012 | |
| CN | 102781103 A | 11/2012 | |
| CN | 102783053 A | 11/2012 | |
| CN | 102801514 A | 11/2012 | |
| CN | 102820960 A | 12/2012 | |
| CN | 102986286 A | 3/2013 | |
| CN | 108964648 A | 12/2018 | |
| EP | 2429239 A3 | 4/2012 | |
| EP | 2 530 863 A2 | 12/2012 | |
| EP | 2680654 A1 * | 1/2014 | .......... H04L 5/001 |
| EP | 2826184 B1 * | 3/2019 | .......... H04L 1/1854 |
| EP | 3309988 B1 * | 7/2021 | .......... H04L 1/1607 |
| EP | 2807775 B1 * | 3/2022 | .......... H04J 3/16 |
| JP | 2014-509500 A | 4/2014 | |
| WO | WO 2012/108720 | 8/2012 | |
| WO | WO 2012/109195 A2 | 8/2012 | |
| WO | WO 2012/112008 A2 | 8/2012 | |
| WO | WO 2012/113345 A1 | 8/2012 | |
| WO | WO 2012/118279 A1 | 9/2012 | |
| WO | WO 2012/121509 A2 | 9/2012 | |
| WO | WO 2012/124980 | 9/2012 | |
| WO | WO 2012/124996 | 9/2012 | |
| WO | WO 2012/126558 A2 | 9/2012 | |
| WO | WO 2012/139272 A1 | 10/2012 | |
| WO | WO 2012/139291 A1 | 10/2012 | |
| WO | WO 2012/142123 A2 | 10/2012 | |
| WO | WO-2013041058 A1 * | 3/2013 | .......... H04B 7/15542 |
| WO | WO-2013042936 A1 * | 3/2013 | .......... H04B 7/2612 |
| WO | WO-2013066072 A1 * | 5/2013 | .......... H04B 7/2656 |
| WO | WO 2014/068891 A1 | 5/2014 | |

OTHER PUBLICATIONS

Samsung, "Discussion on HARQ-ACK transmission for format 1b with channel selection", 3GPP TSG RAN WG1 #70, R1-123466, pp. 1-4, (2012).
New Postcom, "Remaining issues on support of different TDD UL-DL configurations on different bands", 3GPP TSG RAN WG1 Meeting #70, R1-123358, pp. 1-4, (2012).
Notice of Cancelation of Pretrial Reexamination mailed by the Japanese Patent Office on Nov. 2, 2016, in counterpart Japanese Patent Application No. 2016-504437.
Notification of Reasons for Refusal dated Apr. 12, 2016, by the Japanese Patent Office in counterpart Japanese Patent Application No. 2016-504437.
Extended European Search Report issued by the European Patent Office dated Nov. 15, 2016, in counterpart European Patent Application No. 13879686.3.
Written Opinion and Search Report issued by the Singapore Patent Office dated May 5, 2016 in counterpart Singapore Patent Application No. 11201506931T.
International Search Report and Written Opinion dated Jan. 9, 2014 in corresponding PCT International Application.
Notification of the Fires Office Action dated Jul. 3, 2017, from the State Intellectual Property Office of the People's Republic of China in counterpart Chinese Patent Application No. 2013800746531.
Notification of Reasons for Refusal dated Jun. 12, 2018, in corresponding Japanese Patent Application No. 2016-504437.
NTT DOCOMO, 3GPP TSG RAN WG1 Meeting #60, R1-101212, "DL and UL CC Linkage for Carrier Aggregation" NTT DOCOMO Agenda Item: P ?.17, Document for: Discussion and Decision, San Francisco, USA, Feb. 22-26, 2010, pp. 1-6.
Samsung. 3GPP TSG RAN WG1 #66b, R1-113079, "Views on open questions for CA with different TDD UL-DL configurations". Samsung. Agenda Item: 7.2.1.5.1, document for Discussion and Decision, Zhuhai, China, Oct. 10-14, 2011, pp. 1-3.
Extended European search report issued in EP 19204579.7, dated Feb. 19, 2020.
Notification of First Office Action dated Oct. 9, 2020, issued by the Chinese Patent Office in counterpart Chinese Patent Application No. 2016106076835.
Chinese Office Action for CN Application No. 201910411176.9 dated May 6, 2021 with English Translation.
JP Office Action for JP Application No. 2021-069110, dated Oct. 25, 2022 with English Translation.

* cited by examiner

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 4

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 5

| Pcell configuration | 0 | 1 | 2 | 3 | 4 | 5 | 6 |
|---|---|---|---|---|---|---|---|
| Scell HARQ timing reference configureation | 3,4,5 | 4,5 | 5 | 4,5 | 5 | 5 | 3,4,5 |
| Available downlink subframes for Scell of Solution 2 | 7,8,9 | 8,9 | 9 | 8,9 | 9 | 9 | 7,8,9 |
| Available downlink subframes for Scell of Solution 1 | 4 | 6 | 8 | 7 | 8 | 9 | 5 |

| Pcell UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6,5 | 5,4 | 4 | - | - | 6,5 | 5,4 | 4 |
| 1 | - | - | 7,6,5 | 5,4 | | - | - | 7,6,5 | 5,4 | |
| 2 | - | - | 8,7,6,5,4 | | - | - | - | 8,7,6,5,4 | - | - |
| 3 | - | - | 11,10,9,8 | 8,7,6 | 6,5,4 | - | - | - | - | - |
| 4 | - | - | 12,11,10,9,8 | 8,7,6,5,4 | | - | - | - | - | - |
| 5 | - | - | 13,12,11,10,9,8,7,6,5,4 | - | - | - | - | - | - | - |
| 6 | - | - | 8,7 | 7,6 | 6,5 | - | - | 7,6 | 6,5 | - |

| Scheduling cell configuration (TDD-CC) | Reference configuration of Solution B (Available subframes) | | Solution A (Available subframes) |
|---|---|---|---|
| 0 | 0(6) | 6(5) | 6 |
| 1 | 0(6) | 6(5) | 4 |
| 2 | 0(6) | 6(5) | 2 |
| 3 | 0(6) | 6(5) | 3 |
| 4 | 0(6) | 6(5) | 2 |
| 5 | 0(6) | 6(5) | 1 |
| 6 | 0(6) | 6(5) | 5 |

METHOD AND APPARATUS FOR DETERMINING HARQ TIMING IN COMMUNICATION SYSTEMS

CROSS-REFERENCE TO RELATED APPLICATIONS

The present application is a continuation application of U.S. patent application Ser. No. 16/657,778 filed on Oct. 18, 2019, which is a continuation application of U.S. patent application Ser. No. 15/844,143 filed on Dec. 15, 2017, which is issued as U.S. Pat. No. 10,484,145, which is a continuation application of U.S. patent application Ser. No. 14/772,296 filed on Nov. 19, 2019, which is issued as U.S. Pat. No. 9,882,681, which is a National Stage Entry of international application PCT/CN2013/073335, filed Mar. 28, 2013, the disclosures of all of which are incorporated in their entirety by reference herein.

TECHNICAL FIELD

Embodiments of the present invention generally relate to a wireless communication system, and more particularly to methods, apparatuses, a base station, a user equipment and a computer program for determining Hybrid Automatic Repeat Request (HARQ) timing in a communication system supporting Carrier Aggregation (CA).

BACKGROUND

This section introduces aspects that may facilitate a better understanding of the invention(s). Accordingly, the statements of this section are to be read in this light and are not to be understood as admissions about what is in the prior art or what is not in the prior art.

Long Term Evolution (LTE) and LTE-Advanced (LTE-A) standards and/or protocols defined by the Third Generation Partnership Project (3GPP, 3GPP2) are one of the next generation cellular communication standards. According to the multiplexing method, LTE and LTE-A systems include two modes, Frequency Division Duplex (FDD) and Time Division Duplex (TDD). Service providers are expected to implement both types of systems depending on the circumstances of the deployment scenario. The advantages to deploying a TDD system include providing flexible resource utilization (e.g., based on traffic characteristics) through different uplink-downlink (UL-DL) configurations.

To meet LTE-A requirements, support of wider transmission bandwidths is required than the 20 MHz bandwidth specified in 3GPP Release 8/9. The preferred solution to this is Carrier Aggregation (CA). In CA, two or more Component Carriers (CCs) are aggregated in order to support wider transmission bandwidths up to 100 MHz. A user equipment (UE) may simultaneously receive or transmit on one or multiple CCs depending on its capabilities. Combined with inter-band CA, more flexibility can be achieved using carrier aggregation of FDD band and TDD band.

In LTE Release 10, carrier aggregation of FDD and carrier aggregation of TDD with same UL-DL configuration are supported to get higher data rate and higher spectral efficiency. In LTE Release 11, carrier aggregation of TDD with different UL-DL configurations on different bands is also supported to further improve the data rate and spectral efficiency. In 3GPP TSG RAN meeting #58, RP-122022, "Further LTE Carrier Aggregation Enhancements", carrier aggregation of FDD and TDD is proposed as a work item.

In CA of FDD and TDD, either TDD or FDD can be configured as primary cell (Pcell).

Pcell is the cell operating on the primary frequency, in which the UE either performs the initial connection establishment procedure or initiates the connection re-establishment procedure, or the cell indicated as the primary cell in the handover procedure. Secondary cell (Scell) is a cell operating on a secondary frequency, which may be configured once an RRC connection is established and which may be used to provide additional radio resources. For a UE in RRC_CONNECTED configured with CA, the term "serving cells" is used to denote the set of one or more cells comprising of the primary cell and all secondary cells.

In order to prepare against a decoding failure that occurs at initial transmission, LTE/LTE-A adopts Hybrid Automatic Repeat Request (HARQ) for retransmission of the decoding-failed data on the physical layer.

HARQ is a technique in which, when decoding fails, the receiver sends the transmitter a Negative ACKnowledgement (NACK) such that the transmitter retransmits the decoding-failed data. If the data is decoded successfully, the receiver sends the transmitter an ACKnowledgement (ACK) such that the transmitter sends new data.

Normally, the HARQ feedback corresponding to physical downlink channel, for example, Physical Downlink Shared CHannel (PDSCH) is transmitted on physical uplink channel, such as Physical Uplink Control Channel (PUCCH) or Physical Uplink Shared Channel (PUSCH), according to predefined timing, and the HARQ feedback corresponding to physical uplink channel, for example, Physical Uplink Shared CHannel (PUSCH) is transmitted on physical downlink channel, such as Physical Hybrid ARQ Indicator CHannel (PHICH), according to predefined timing.

In European patent application EP2530863A2, a method for defining physical channel transmit/receiving timings and resource allocation is provided for use in a TDD system supporting CA.

However, in the prior art, there is no solution for defining HARQ feedback timing for a communication system supporting CA of FDD and TDD.

SUMMARY

To better address one or more of the above concerns, in a first aspect of the invention, a method for receiving, at a base station, a Hybrid Automatic Repeat Request (HARQ) feedback from a user equipment in a communication system supporting Carrier Aggregation (CA) of a primary cell and at least one secondary cell is provided. The primary cell and secondary cell support either Frequency Divisional Duplex (FDD) or Time Divisional Duplex (TDD). The method comprises: transmitting a downlink physical channel through one of the primary and secondary cells; receiving the HARQ feedback corresponding to the downlink physical channel of the primary cell at a first timing predetermined for the primary cell; and receiving the HARQ feedback corresponding to the downlink physical channel of the secondary cell at a second timing. The second timing is determined according to one or more of duplex modes of the primary cell and the secondary cell, a scheduling mode of the secondary cell, and predefined rules.

In some embodiments, the duplex mode is selected from TDD and FDD, the scheduling mode is selected from self scheduling and cross carrier scheduling, and the predefined rules comprise the HARQ feedback can only be transmitted on a component carrier of the primary cell.

In some embodiments, the second timing is identical with the first timing, for both self scheduling and cross carrier scheduling of the secondary cell, when the primary cell is configured as FDD.

In some embodiments, the second timing is identical with the first timing, for cross carrier scheduling of the secondary cell, when the primary cell is configured as TDD.

In some embodiments, the second timing is determined according to any one of the following, for self scheduling of the secondary cell, when the primary cell is configured as TDD and said secondary cell is configured as FDD: being identical with the first timing; being identical with a third timing for a TDD configuration which has more available downlink subframes than the TDD configuration of the primary cell; and a fourth timing specific to said secondary cell.

In further embodiments, the fourth timing is determined as below: for a first downlink subframe which is also downlink subframe in the primary cell, the timing of the first downlink subframe is identical with the first timing; and for a second downlink subframe which is uplink subframe in the primary cell, the timing of the second downlink subframe is identical with a maximum of a timing of a downlink subframe of the primary cell which is closest to the second downlink subframe and a processing delay. Optionally, the fourth timing is further adjusted according to the number of uplink subframes of the primary cell to balance the HARQ feedback among the uplink subframes of the primary cell, meanwhile minimizing HARQ feedback delay.

In a second aspect of the invention, a method for transmitting, at a user equipment, a Hybrid Automatic Repeat Request (HARQ) feedback to a base station in a communication system supporting Carrier Aggregation (CA) of a primary cell and at least one secondary cell is provided. The primary cell and secondary cell support either Frequency Divisional Duplex (FDD) or Time Divisional Duplex (TDD). The method comprises: receiving a downlink physical channel through one of the primary and secondary cells; transmitting the HARQ feedback corresponding to the downlink physical channel of the primary cell at a first timing predetermined for the primary cell; and transmitting the HARQ feedback corresponding to the downlink physical channel of the secondary cell at a second timing. The second timing is determined according to one or more of duplex modes of the primary cell and the secondary cell, a scheduling mode of the secondary cell, and predefined rules.

In a third aspect of the invention, a method for transmitting, at a base station, a Hybrid Automatic Repeat Request (HARQ) feedback to a user equipment in a communication system supporting Carrier Aggregation (CA) of a primary cell and at least one secondary cell is provided. The primary cell and secondary cell support either Frequency Divisional Duplex (FDD) or Time Divisional Duplex (TDD). The method comprises: receiving an uplink physical channel through one of the primary and secondary cells; transmitting the HARQ feedback corresponding to the uplink physical channel of the primary cell at a first timing predetermined for the primary cell; and transmitting the HARQ feedback corresponding to the uplink physical channel of the secondary cell at a second timing. The second timing is determined according to one or more of duplex modes of the primary cell and the secondary cell, a scheduling mode of the secondary cell, and predefined rules.

In some embodiments, the duplex mode is selected from TDD and FDD, the scheduling mode is selected from self scheduling and cross carrier scheduling, and the predefined rules comprise the HARQ feedback can only be transmitted on a component carrier which carriers an uplink grant.

In some embodiments, for self scheduling, the second timing is identical with a timing predetermined for the secondary cell.

In some embodiments, for cross carrier scheduling, the second timing is further determined according to the duplex modes of a scheduling cell and a scheduled cell.

In further embodiments, the second timing is identical with a timing predetermined for the secondary cell when the secondary cell is a scheduling cell.

In further embodiments, the second timing is identical with a timing predetermined for the secondary cell when the secondary cell is configured as TDD and scheduled by a FDD component carrier cell.

Further, the second timing is determined according to any one of the following, when the secondary cell is configured as FDD and scheduled by a TDD component carrier cell: being identical with the first timing; and being identical with a third timing for a TDD configuration which can use uplink subframes of the secondary cell as much as possible.

In a fourth aspect of the invention, a method for receiving, at a user equipment, a Hybrid Automatic Repeat Request (HARQ) feedback from a base station in a communication system supporting Carrier Aggregation (CA) of a primary cell and at least one secondary cell is provided. The primary cell and secondary cell support either Frequency Divisional Duplex (FDD) or Time Divisional Duplex (TDD). The method comprises: transmitting an uplink physical channel through one of the primary and secondary cells; receiving the HARQ feedback corresponding to the uplink physical channel of the primary cell at a first timing predetermined for the primary cell; and receiving the HARQ feedback corresponding to the uplink physical channel of the secondary cell at a second timing. The second timing is determined according to one or more of duplex modes of the primary cell and the secondary cell, a scheduling mode of the secondary cell, and predefined rules.

In a fifth aspect of the invention, an apparatus is provided to implement various embodiments of the method of the first aspect of the invention. The apparatus comprises a transmitter configured to transmit a downlink physical channel through one of the primary and secondary cells. The apparatus further comprises a receiver configured to receive the HARQ feedback corresponding to the downlink physical channel of the primary cell at a first timing predetermined for the primary cell; and to receive the HARQ feedback corresponding to the downlink physical channel of the secondary cell at a second timing. The second timing is determined according to one or more of duplex modes of the primary cell and the secondary cell, a scheduling mode of the secondary cell, and predefined rules.

In a sixth aspect of the invention, an apparatus is provided to implement various embodiments of the method of the second aspect of the invention. The apparatus comprises a receiver configured to receive a downlink physical channel through one of the primary and secondary cells. The apparatus further comprise a transmitter configured to transmit the HARQ feedback corresponding to the downlink physical channel of the primary cell at a first timing predetermined for the primary cell; and to transmit the HARQ feedback corresponding to the downlink physical channel of the secondary cell at a second timing. The second timing is determined according to one or more of duplex modes of the primary cell and the secondary cell, a scheduling mode of the secondary cell, and predefined rules.

In a seventh aspect of the invention, an apparatus is provided to implement various embodiments of the method of the third aspect of the invention. The apparatus comprises a receiver configured to receive an uplink physical channel through one of the primary and secondary cells. The apparatus further comprises a transmitter configured to transmit the HARQ feedback corresponding to the uplink physical channel of the primary cell at a first timing predetermined for the primary cell; and to transmit the HARQ feedback corresponding to the uplink physical channel of the secondary cell at a second timing. The second timing is determined according to one or more of duplex modes of the primary cell and the secondary cell, a scheduling mode of the secondary cell, and predefined rules.

In an eighth aspect of the invention, an apparatus is provided to implement various embodiments of the method of the fourth aspect of the invention. The apparatus comprises a transmitter configured to transmit an uplink physical channel through one of the primary and secondary cells. The apparatus further comprises a receiver configured to receive the HARQ feedback corresponding to the uplink physical channel of the primary cell at a first timing predetermined for the primary cell; and to receive the HARQ feedback corresponding to the uplink physical channel of the secondary cell at a second timing. The second timing is determined according to one or more of duplex modes of the primary cell and the secondary cell, a scheduling mode of the secondary cell, and predefined rules.

In a ninth aspect of the invention, an apparatus is provided, which comprises at least one processor and at least one memory including computer program code. The memory and the computer program code are configured to cause the apparatus to perform embodiments of the method of the first, the second, the third or the fourth aspect of the invention.

In a tenth aspect of the invention, a computer program product is provided, which, comprises at least one computer readable storage medium having a computer readable program code portion stored thereon. The computer readable program code portion comprises program code instructions for perform embodiments of the method of the first, the second, the third or the fourth aspect of the invention.

With particular embodiments of the techniques described in this specification, the HARQ feedback timing is defined for communication systems supporting CA of FDD and TDD. In some embodiment, high peak rate can be maintained, meanwhiling minimizing the feedback delay.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which:

FIG. 4 illustrates PUSCH HARQ timing for TDD defined in LTE specification;

FIG. 5 illustrates PUSCH scheduling timing for TDD defined in LTE specification;

Like reference numbers and designations in the various drawings indicate like elements.

DETAILED DESCRIPTION OF EMBODIMENTS

Figures 1, 2, 3:
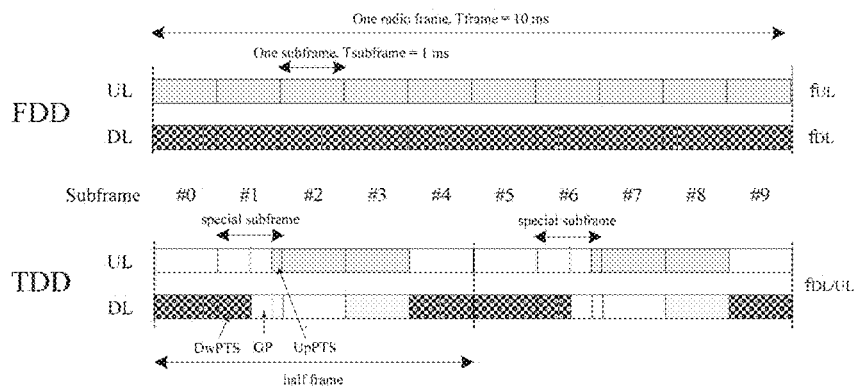
FIG. 1 illustrates the FDD frame structure and the TDD frame structure defined in LTE system.
FIG. 2 illustrates one exemplary set of uplink/downlink subframe allocations in TDD system.
FIG. 3 illustrates PDSCH HARQ timing for TDD defined in LTE specification.

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In the following description, a base station (BS) is an entity for allocating resources to a terminal and can be any of an enhanced Node B (eNB), a Node B, a BS, a radio access unit, a base station controller, and a node on a network. The terminal can be a user equipment (UE), a mobile station (MS), a cellular phone, a smartphone, a computer, or a multimedia system equipped with communication function.

FIG. 1 shows the FDD frame structure and the TDD frame structure defined in LTE system. As shown in FIG. 1, one radio frame has an overall length of 10 ms.

In FDD frame structure, the frame is divided into a total of 10 subframes, each having a length of 1 ms. The uplink (UL) subframes and the downlink (DL) subframes are transmitted on different frequencies $f_{UL}$ and $f_{DL}$.

In TDD frame structure, the 10 ms frame comprises two half frames, each 5 ms long. Each half frame is further split into five subframes, each 1 ms long. The subframes may be divided into UL transmission subframe, DL transmission subframe, and special subframe. The special subframes consist of three fields: Downlink Pilot Time Slot (DwPTS), Guard Period (GP), and Uplink Pilot Time Slot (UpPTS).

FIG. 2 illustrates one exemplary set of uplink/downlink subframe allocations in TDD system. As shown in FIG. 2, a total of seven up/downlink configurations have been set, and these use either 5 ms or 10 ms switch-point periodicities. In these configurations, different ratios of downlink-to-uplink resources are available for different load conditions. In the subframes shown in FIG. 2, D is a subframe for downlink transmission, S is a "special" subframe used for a guard time, and U is a subframe for uplink transmission. Subframe number 0 to 9 indicate the indices of subframes constituting one radio frame. Skilled in the art should appreciate that the allocations indicated in FIG. 2 are intended to be exemplary and alternative sets of predetermined allocations may also be used.

In case of TDD UL-DL configuration #3, the evolved Node B (eNB) or base station (BS) can transmit downlink data and/or control information at subframes #0, #5, #6, #7, #8, and #9, and can receive uplink data and/or control information at subframes #2, #3, and #4. Here, # indicates number or index. The subframe #1 as special subframe can be used for transmitting downlink control information and/or downlink data selectively and Sounding Reference Signal (SRS) or Random Access Channel (RACH) in uplink.

Because of the different UL-DL configuration between FDD-LTE and TDD-LTE, the HARQ timing corresponding to PDSCH and the HARQ timing corresponding to PUSCH defined in LTE current specifications maybe not work in the scenario of CA of FDD and TDD. In addition, in current LTE specification, PUCCH can be only transmitted on the Pcell, and the PHICH can be only transmitted on the component carrier which carriers the uplink grant.

In current LTE specification, for FDD systems and for single serving cell, the timing relationship between PDSCH and PUCCH carrying uplink HARQ ACK/NACK corresponding to the PDSCH or PUSCH is defined that the HARQ ACK/NACK transmitted in subframe #n is associated with the PDSCH received in subframe #n−4.

For TDD systems and for single serving cell, the timing relationship between PDSCH and PUCCH or PUSCH is more complicated than that for FDD systems.

FIG. 3 illustrates the PDSCH HARQ timing for TDD defined in LTE specification.

The UE receives the PDSCH transmitted by the eNB at an $(n-k)^{th}$ subframe and transmits an uplink HARQ ACK/NACK corresponding to the received PDSCH at an $n^{th}$ subframe. In other words, the HARQ ACK/NACK transmitted in subframe #n is associated with the PDSCHs received in subframe #n−k. Here, k denotes an element of a set K, and K is defined as shown in FIG. 3.

In current LTE specification, for FDD systems and for single serving cell, the timing relationship between PUSCH and PHICH carrying downlink HARQ ACK/NACK corresponding to the PUSCH is defined that the HARQ ACK/NACK transmitted in subframe #n is associated with the PUSCH received in subframe #n−4.

For TDD systems and for single serving cell, the timing relationship between PUSCH and PHICH is more complicated than that for FDD systems.

FIG. 4 illustrates the PUSCH HARQ timing for TDD defined in LTE specification.

The eNB receives the PUSCH transmitted by the UE at an $(n-k_{PHICH})^{th}$ subframe and transmits a downlink HARQ ACK/NACK corresponding to the received PUSCH at an $n^{th}$ subframe. In other words, for PUSCH transmissions scheduled in subframe #n, the UE shall determine the corresponding PHICH resource in subframe #$(n+k_{PHICH})$, where $k_{PHICH}$ is given in FIG. 4.

Typically, the scheduling information for the data to be transmitted on the component carrier is transmitted to the UE in Downlink Control Information (DCI). The DCI can be defined in various formats.

PUSCH scheduling timing is defined in LTE specifications. For FDD, the UE shall upon detection a PDCCH/Enhanced-PDCCH(EPDCCH) with downlink control information (DCI) format 0/4 in subframe #n intended for the UE, adjust the corresponding PUSCH transmission in subframe #n+4 according to the PDCCH/EDPCCH.

FIG. 5 illustrates PUSCH scheduling timing for TDD defined in LTE specification. For TDD, the UE shall upon detection a PDCCH/EPDCCH with DCI format 0/4 in subframe #n intended for the UE, adjust the corresponding PUSCH transmission in subframe n+k according to the PDCCH/EPDCCH, where k is given in FIG. 5.

From above discussion, it can be seen that the timing relationship among the uplink and downlink physical channels such as control channel for data scheduling, scheduled data channel, and HARQ ACK/NACK channel corresponding to the data channel should be defined due to the different UL-DL configurations in TDD system.

The same problem also exists in systems supporting carrier aggregation of FDD and TDD due to the different UL-DL configuration between FDD-LTE and TDD-LTE. Further, in either scenario of CA of FDD and TDD, the following rules should be met, i.e., PUCCH can be only transmitted on the Pcell, and the PHICH carrying downlink HARQ ACK/NACK corresponding to the PUSCH can be only transmitted on the component carrier which carriers the uplink grant.

Figures 6A, 6B, 7:
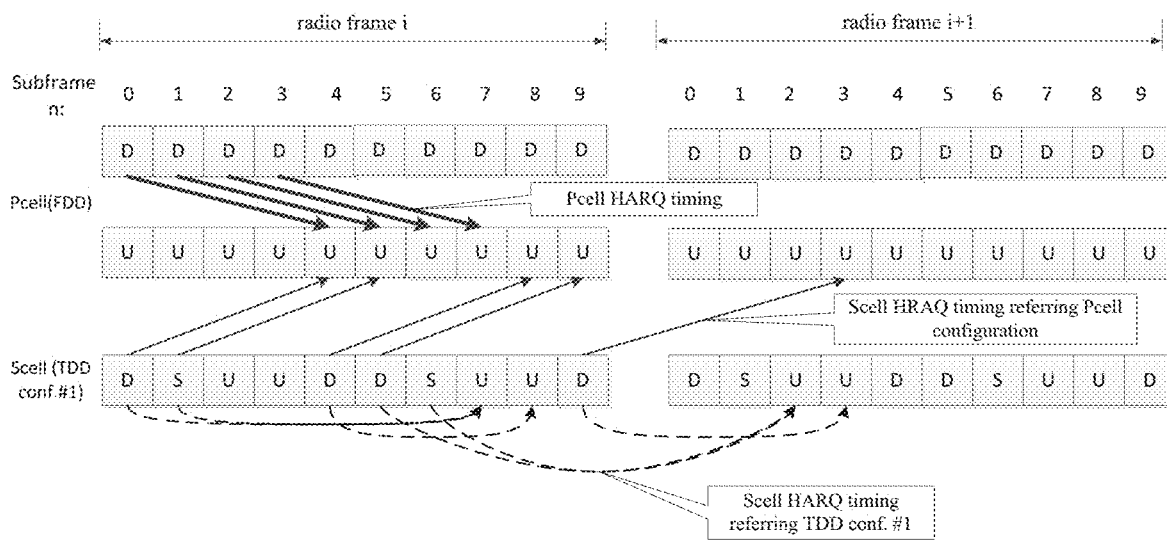
FIGS. 6a-6b illustrate the scenarios of CA of FDD and TDD.
FIG. 7 illustrates a timing relationship among physical channels for use in a case where the Pcell is configured as FDD according to an exemplary embodiment of the present invention.

FIGS. 6a-6b illustrate the scenarios of CA of FDD and TDD. These scenarios are classified according to the duplex mode of the Pcell.

FIG. 6a shows Scenario 1 where the Pcell is configured with FDD component carrier (FDD-CC). In FIG. 6a, since the Pcell is configured as FDD, for any time duration within a radio frame, there is a subframe for downlink (DL) transmission and a subframe for uplink (DL) transmission on different frequencies. FIG. 6a also shows one Scell configured as TDD. The example Scell is configured with TDD UL-DL Configuration #2, where subframes #0, #3, #4, #5, #8, and #9 are downlink subframes for DL transmission, subframes #2 and #7 are uplink subframes for UL transmission, and subframes #1 and #6 are special subframes which can be used for downlink and uplink transmissions. The skilled in the art should appreciate that more Scells are possible and these additional Scells may be either configured as FDD or TDD with different UL-DL configurations.

FIG. 6b shows Scenario 2 where the Pcell is configured with TDD component carrier (TDD-CC). In FIG. 6b, the Pcell is configured with TDD UL-DL Configuration #2. FIG. 6b also shows one Scell configured as FDD, which has a DL subframe and an UL subframe for any time duration within the radio frame. The skilled in the art should appreciate that more Scells are possible and these additional Scells may be either configured as FDD or TDD with different UL-DL configurations.

Please be noted that, for cases where the Pcell and the Scell are both FDD or both TDD with same or different UL-DL configurations, HARQ timing has been defined in some specifications. The proposed solution in the present document intends to the case where the Pcell and the Scell have different duplex modes (TDD/FDD). Thus, unless indicated explicitly, the Pcell and the Scell in discussion have different duplex modes.

The skilled in the art could understand that, the scenarios may be classified according to other factors such as scheduling modes. In the LTE-A systems supporting carrier aggregation, if the component carrier carrying DCI for data transmission and the component carrier carrying the data scheduled as indicated by the DCI differ from each other, this is referred to as cross carrier scheduling. Meanwhile, if the component carrier carrying the DCI for data transmission and the component carrier carrying the data scheduled as indicated by the DCI are identical with each other, this is referred to as self scheduling. The Pcell can not be cross carrier scheduled by any Scell. A Scell can be cross carrier scheduled by the Pcell or another Scell.

In the following, proposed solutions for uplink HARQ-ACK/NACK feedback timing and downlink HARQ-ACK/NACK feedback timing will be described with reference to the above scenarios, respectively. Generally speaking, the HARQ timing is determined according to one or more of the following factors: duplex modes of the Pcell and the Scell, scheduling mode of the Scell, and some predefined rules. The duplex mode is selected from TDD and FDD. The scheduling mode is selected from self scheduling and cross carrier scheduling. For uplink HARQ feedback, the predefined rules may comprise that PUCCH carrying the uplink HARQ feedback can be only transmitted on a component carrier of the Pcell. For downlink HARQ feedback, the predefined rules may comprise that PHICH carrying the downlink HARQ feedback can be only transmitted on the component carrier which carriers the uplink grant.

HARQ-ACK/NACK Timing for Downlink Transmission

Scenario 1

For Scenario 1 where the Pcell is configured as FDD, the Pcell can follow its own PDSCH HARQ timing, i.e., the HARQ timing predetermined for FDD in current LTE specification. More specifically, the HARQ-ACK/NACK transmitted in subframe #n is associated with the PDSCH received in subframe #n−4.

One Scell in Scenario 1 can also follow the HARQ timing of the Pcell for both self scheduling and cross carrier scheduling. That is, the HARQ-ACK/NACK transmitted in subframe #n is associated with the PDSCH received in subframe #n−4.

FIG. 7 illustrates a timing relationship among physical channels for use in a case where the Pcell is configured as FDD according to an exemplary embodiment of the present invention. In the example in FIG. 7, a Scell is configured with TDD UL-DL configuration #1.

Referring to FIG. 7, the black bold lines indicate the Pcell HARQ timing relationship, i.e., the uplink HRAQ feedback in subframe #n is associated with the PDSCH received in subframe #n−4. In FIG. 7, the thin solid lines indicate the Scell HARQ timing referring the HARQ timing of the Pcell according to one embodiment. However, the Scell configured with TDD UL-DL configuration #1 can receive downlink transmission only in subframes #0, #1, #4, #5, #6, and #9, and thus the corresponding uplink HARQ feedback is transmitted in UL subframes #4, #5, #8, #9 of the current radio frame i and in UL subframes #1 and #4 of the next radio frame i+1 on the component carrier of the Pcell when the HARQ feedback is carried on PUCCH. FIG. 7 also shows the Scell HARQ timing referring its own HARQ timing (indicated by thin dotted lines), i.e., the HARQ timing for TDD UL-DL configuration #1, which has been discussed with respect to FIG. 3.

From the comparison of the two kinds of HARQ timing for Scell, it can be seen that the proposed timing (indicated by thin solid lines) can decrease the HARQ feedback delay compared with the scheme that Scell follows its own HARQ timing configuration (indicated by thin dotted lines).

Scenario 2

For Scenario 2 where the Pcell is configured as TDD, the Pcell can follow its own PDSCH HARQ timing, i.e., the HARQ timing predetermined for TDD in current LTE specification as previously discussed with respect to FIG. 3.

For a Scell (FDD-CC) in Scenario 2, the HARQ timing can be determined further based on the scheduling modes of the Scell.

If the Scell is cross carrier scheduled by the Pcell or by another Scell, the Scell can refers the HARQ timing of the Pcell (TDD-CC).

Figure 8:
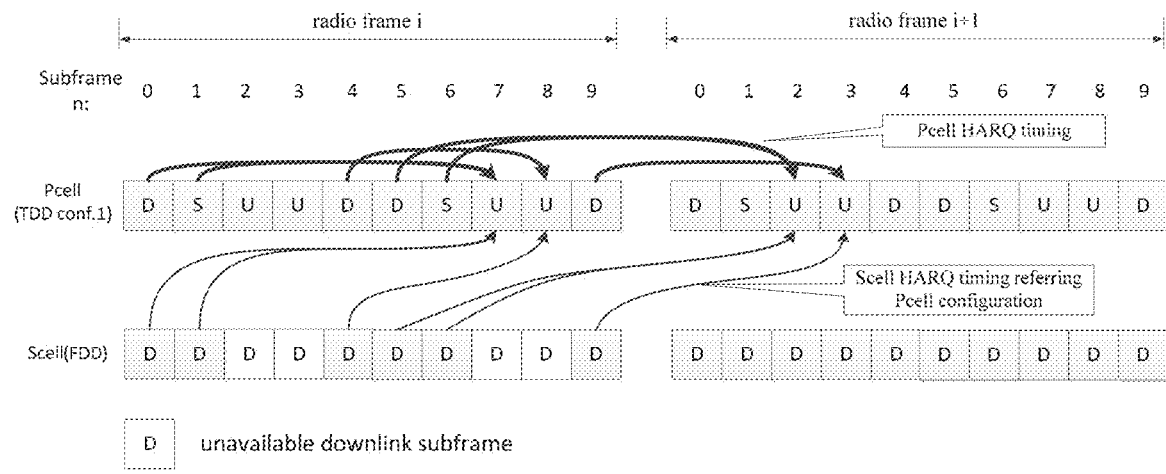
FIG. 8 illustrate a timing relationship among physical channels for use in a case where the Pcell is configured as TDD and the Scell is cross carrier scheduled, according to an exemplary embodiment of the present invention.

FIG. 8 illustrate a timing relationship among physical channels for use in a case where the Pcell is configured as TDD and the Scell (FDD-CC) is cross carrier scheduled, according to an exemplary embodiment of the present invention. In the example in FIG. 8, the Pcell is configured with TDD UL-DL configuration #1.

Referring to FIG. 8, the black bold lines indicate the Pcell HARQ timing relationship, i.e., the uplink HRAQ feedback timing for TDD UL-DL configuration #1.

In FIG. 8, the thin solid lines indicate the Scell HARQ timing referring the HARQ timing of the Pcell according to one embodiment. However, since the Pcell is configured with TDD UL-DL configuration #1, only subframes #0, #1, #4, #5, #6, and #9 can be used to receive downlink transmission, and thus the subframes of the Scell (FDD-CC) which correspond to uplink subframes of the Pcell (TDD-CC) cannot be used for downlink transmission. For example, subframes #2, #3, #7, and #8 of the Scell are unavailable for downlink transmission, which are indicated by dashed blocks in FIG. 8. Referring the HARQ timing of the Pcell, for example, the BS transmits PDSCH to the UE through the Scell at the subframe #0. Then, according to the timing relationship defined for TDD UL-DL configuration #1, the UE will transmits the HARQ-ACK/NACK corresponding to the received PDSCH at the subframe #7 through the Pcell.

If the Scell is self scheduled, several solutions have been proposed for the HARQ timing of the Scell.

Solution 1

The first solution is that the Scell refers the HARQ timing of the Pcell.

Figure 9:
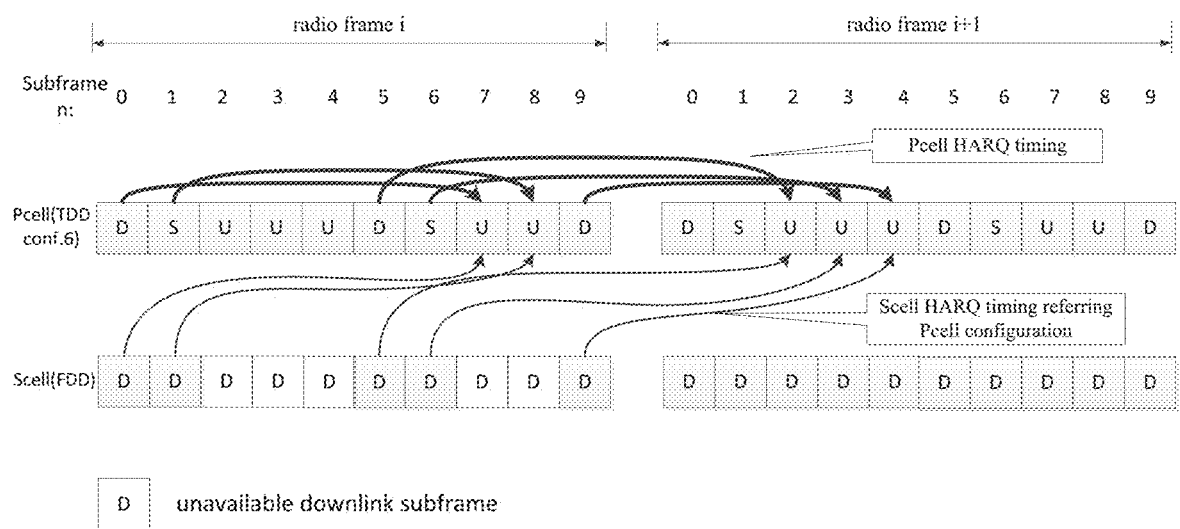
FIG. 9 illustrate a first example timing relationship among physical channels for use in a case where the Pcell is configured as TDD and the Scell (FDD-CC) is self scheduled, according to an exemplary embodiment of the present invention.

FIG. 9 illustrate a first example timing relationship among physical channels for use in a case where the Pcell is configured as TDD and the Scell (FDD-CC) is self scheduled, according to an exemplary embodiment of the present invention. In the example in FIG. 9, the Pcell is configured with TDD UL-DL configuration #6.

Referring to FIG. 9, the black bold lines indicate the Pcell HARQ timing relationship, i.e., the uplink HRAQ feedback timing for TDD UL-DL configuration #6, which has been discussed with respect to FIG. 3.

In FIG. 9, the thin solid lines indicate the Scell HARQ timing referring the HARQ timing of the Pcell according to the first solution. However, since the Pcell is configured with TDD UL-DL configuration #6, only subframes #0, #1, #5, #6, and #9 can be used to receive downlink transmission, and thus the subframes of the Scell (FDD-CC) which correspond to uplink subframes of the Pcell (TDD-CC) cannot be used for downlink transmission. For example, subframes #2, #3, #4, #7, and #8 of the Scell are unavailable for downlink transmission, which are indicated by dashed blocks in FIG. 9. Referring the HARQ timing of the Pcell, for example, the BS transmits PDSCH to the UE through the Scell at the subframe #0. Then, according to the timing relationship defined for TDD UL-DL configuration #6, the UE will transmits the HARQ-ACK/NACK corresponding to the received PDSCH at the subframe #7 through the Pcell.

The first solution has advantage in little impact to the existing specifications. However, since some downlink subframes of the Scell are unavailable, the peak rate will be decreased.

Solution 2

The second solution is that the Scell refers the HARQ timing of one TDD UL-DL configuration which has more available downlink subframes then the TDD UL-DL configuration of the Pcell.

Figures 10, 11:
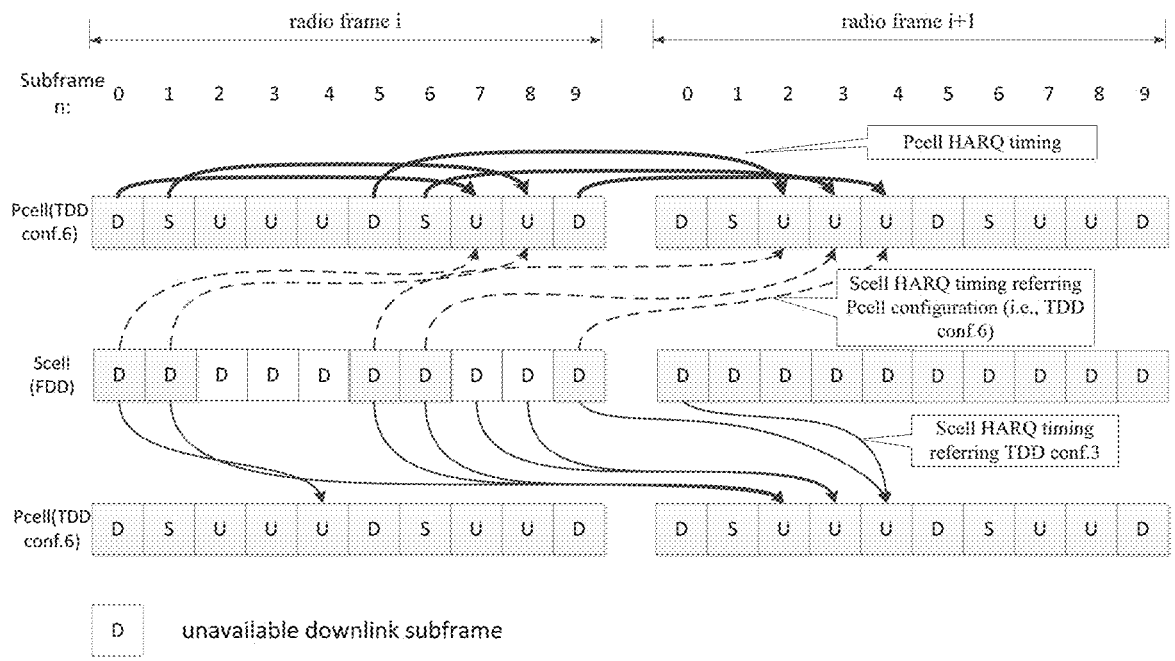
FIG. 10 illustrate a second example timing relationship among physical channels for use in a case where the Pcell is configured as TDD and the Scell (FDD-CC) is self scheduled, according to an exemplary embodiment of the present invention.
FIG. 11 shows a table for the number of available downlink subframes according to the second solution.

FIG. 10 illustrate a second example timing relationship among physical channels for use in a case where the Pcell is configured as TDD and the Scell (FDD-CC) is self scheduled, according to an exemplary embodiment of the present invention. In the example in FIG. 10, the Pcell is configured with TDD UL-DL configuration #6.

Referring to FIG. 10, the black bold lines indicate the Pcell HARQ timing relationship, i.e., the uplink HRAQ feedback timing for TDD UL-DL configuration #6.

In FIG. 10, the thin solid lines indicate the Scell HARQ timing referring another TDD configuration (e.g., TDD UL-DL configuration #3) according to the second solution. As shown, since TDD UL-DL configuration #3 have more downlink subframes than TDD configuration #6 of the Pcell, more downlink subframes of the Scell can be available for transmission. For example, the BS transmits PDSCH to the UE through the Scell at the subframe #7. Then, according to the timing relationship defined for TDD UL-DL configuration #3, the UE will transmits the HARQ-ACK/NACK corresponding to the received PDSCH at the subframe #3 of the next radio frame i+1 through the Pcell. With this second solution, only 3 subframes #2, #3, #4 of the Scell are unavailable for downlink transmission, which are indicated by dashed blocks in FIG. 10.

For comparison, FIG. 10 also shows the Scell HARQ timing referring the Pcell configuration according to the first solution. In this case, 5 subframes #2, #3, #4, #7, and #8 of the Scell are unavailable for downlink transmission.

Thus, the second solution also has advantages in little impact to the existing specifications. Moreover, the second solution can provide much more available downlink subframes compared with the first solution and thereby the peak rate is higher.

FIG. 11 shows a table for the number of available downlink subframes according to the second solution. The configuration referred by the Scell may be represented as "Scell HARQ timing reference configuration".

In the table of FIG. 11, the first line is the TDD UL-DL configuration for Pcell, the second line is the TDD UL-DL configuration of the Scell HARQ timing reference configuration, and the third line is the number of available downlink subframes for the Scell (FDD-CC). For the purpose of comparison, a fourth line is added to show the number of available downlink subframes for the Scell according to the first solution.

For example, if the Pcell is configured with TDD configuration #3, then the Scell (FDD) can refer the HARQ timing of TDD configuration #4 or #5. The numbers of available DL subframes for the two configurations #4 and #5 are 8 and 9, respectively, each of which is greater than the number (7) of available DL subframes when referring the Pcell configuration (i.e., TDD configuration #3).

Solution 3

The third solution is to define a new HARQ timing specific to the Scell.

The designing of the HARQ timing for the Scell (FDD) may be performed by three steps. At Step 1, for a first DL subframe which is also DL subframe in the Pcell (TDD), the timing of the first DL subframe is identical with the timing for the Pcell.

At Step 2, for a second DL subframe which is UL subframe in the Pcell (TDD), the timing of the second DL subframe is identical with a maximum of a timing of a DL subframe of the Pcell which is closest to the second DL subframe and a processing delay. That is, the timing must be not smaller than the processing delay (e.g., 4 ms). Further, during the Step 2, the feedback delay may also be taken into consideration. Apparently, the feedback delay should be kept as small as possible.

At optional Step 3, the timing is further adjusted according to the number of UL subframes of the Pcell, in order to balance the HARQ feedback overhead (i.e., PUCCH overhead) among the UL subframes of the Pcell, meanwhile minimizing HARQ feedback delay. Thus, the transmissions of HARQ-ACK/NACK are distributed in the uplink subframes of the Pcell as equally as possible.

Figure 12:
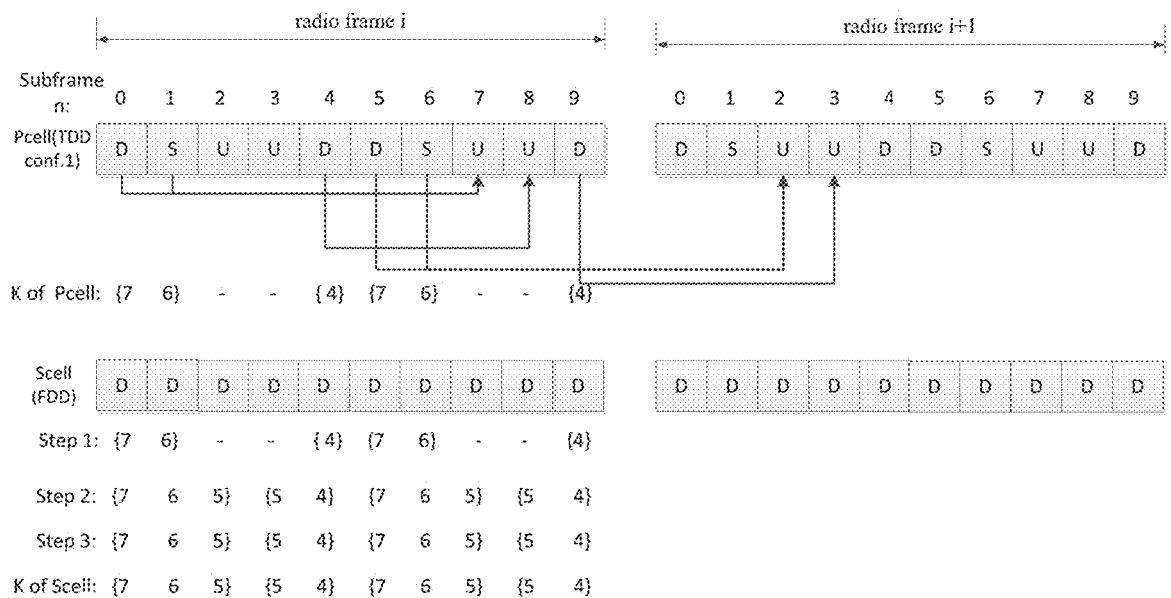
FIG. 12 depicts an exemplary design process for a Scell (FDD) in a case where the Pcell is configured as TDD and the Scell (FDD) is self scheduled according to a third solution of embodiments of the present invention.

FIG. 12 depicts an exemplary design process for a Scell (FDD) in a case where the Pcell is configured as TDD and the Scell (FDD) is self scheduled according to the third solution of the present invention. In the example in FIG. 12, the Pcell is configured with TDD UL-DL configuration #1, and the HARQ timing relationship is shown through the solid arrows in the figure. In each radio frame of the Pcell, there are four UL subframes, and thus there are four sets K, which are {7, 6}, {4}, {7, 6} and {4}. Each set K corresponds to an UL subframe. The set K and its element k are defined in FIG. 3 as described previously.

When designing for the Scell (FDD) according to the third solution, at the Step 1, for subframes #0, #1, #4, #5, #6, and #9 (a first type of DL subframe), which are also DL subframes in the Pcell (TDD configuration #1), the timing of these DL subframe is identical with the timing for the Pcell. Thus, four sets can be obtained, {7, 6}, {4}, {7, 6} and {4}.

At the Step 2, for subframes #2, #3, #7, and #8 (a second type of DL subframe), which are UL subframes in the Pcell (TDD), the timing of these DL subframe is identical with a maximum of a timing of a DL subframe of the Pcell which is closest to the second DL subframe and a processing delay (4 ms in this example). For example, the timing for subframe #2 is identical with that for subframe #1 whose HARQ ACK/NACK will be transmitted in subframe #7 of the radio frame i. Thus, the HARQ ACK/NACK corresponding to subframe #2 will also be transmitted in subframe #7 of the radio frame i, and therefore k value for subframe #2 is 5. Similarly, the timing for other subframes #3, #7, and #8 can be determined. Then, the four sets can be updated as {7, 6, 5}, {5, 4}, {7, 6, 5} and {5, 4}.

Optionally, the design may be further optimized at Step 3 to balance the HARQ feedback overhead among the UL subframes of the Pcell. The size of each set should be close to 10/N, where N is the number of UL subframes of the Pcell. In the example in FIG. 12, N=4. Therefore, after adjustment at Step 3, the four sets are still {7, 6, 5}, {5, 4}, {7, 6, 5} and {5, 4}.

Finally, the four sets {7, 6, 5}, {5, 4}, {7, 6, 5} and {5, 4} are used for the HARQ timing of the Scell.

Figure 13:
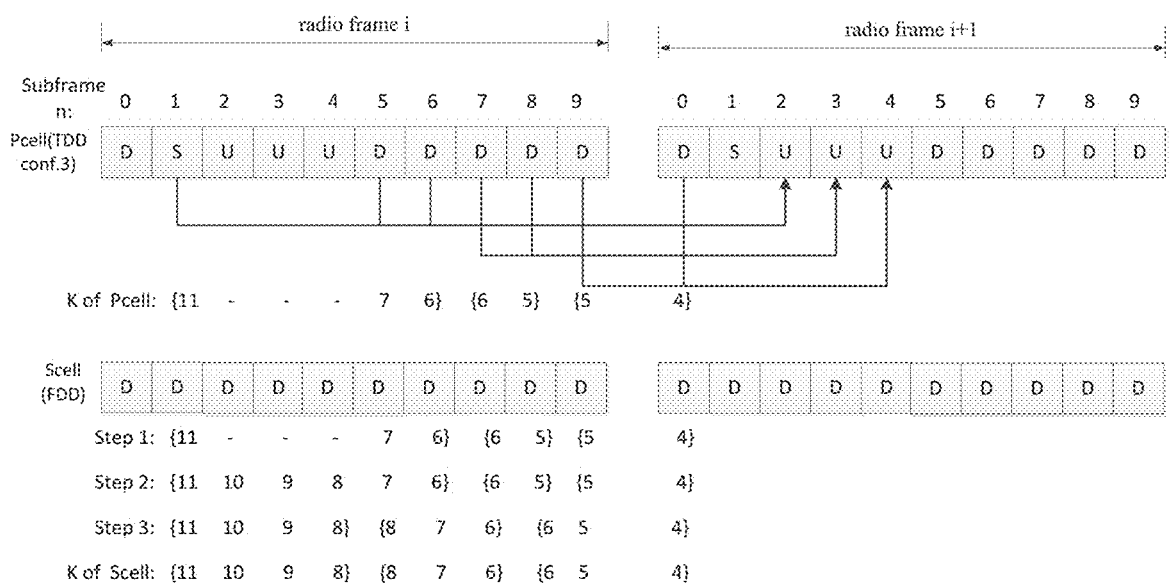
FIG. 13 depicts another exemplary design process for a Scell (FDD) in a case where the Pcell is configured as TDD and the Scell (FDD) is self scheduled according to the third solution of embodiments of the present invention.

FIG. 13 depicts another exemplary design process for a Scell (FDD) in a case where the Pcell is configured as TDD and the Scell (FDD) is self scheduled according to the third solution of the present invention. In the example in FIG. 13, the Pcell is configured with TDD UL-DL configuration #3, and the HARQ timing relationship is shown through the solid arrows in the figure. In each radio frame of the Pcell, there are three UL subframes, and thus there are three sets K, which are {11, 7, 6}, {6, 5} and {5, 4}, corresponding to UL subframe #2, #3, and #4, respectively.

At the Step 1, for subframes #0, #1, #5, #6, #7, #8, and #9 (a first type of DL subframe), the timing of these DL subframe is identical with the timing for the Pcell. Thus, three sets can be obtained, {11, 7, 6}, {6, 5} and {5, 4}.

At the Step 2, for subframes #2, #3, and #4 (a second type of DL subframe), the timing of these DL subframe is identical with a maximum of a timing of a DL subframe of the Pcell which is closest to the second DL subframe and a processing delay (4 ms in this example). For example, the closest DL subframe of the Pcell to subframe #2 of the Scell is DL subframe #1, and thus the timing for subframe #2 is identical with that for subframe #1 whose HARQ ACK/NACK will be transmitted in subframe #2 of the next radio frame i+1. Thus, the HARQ ACK/NACK corresponding to subframe #2 will also be transmitted in subframe #2 of the next radio frame i+1, and therefore k value for subframe #2 is 10. Similarly, the timing for other subframes #3 and #4 can be determined. Then, the three sets are updated as {11, 10, 9, 8, 7, 6}, {6, 5} and {5, 4}.

Optionally, the design is further optimized at Step 3 to balance the HARQ feedback overhead among the UL subframes of the Pcell. In this example, the number of UL subframes of the Pcell is N=3, and the roundness of 10/N is 3. The three sets are so adjusted that the size of each set is close to 3, meanwhile minimizing the feedback delay. Specifically, in the example in FIG. 13, subframe #8 is moved into the third set, and subframes #5 and #6 are moved into the second set. After adjustment, the three sets are updated as {11, 10, 9, 8}, {8, 7, 6} and {6, 5, 4}.

Finally, the three sets {11, 10, 9, 8}, {8, 7, 6} and {6, 5, 4} are used for the HARQ timing of the Scell.

Figures 14, 15:
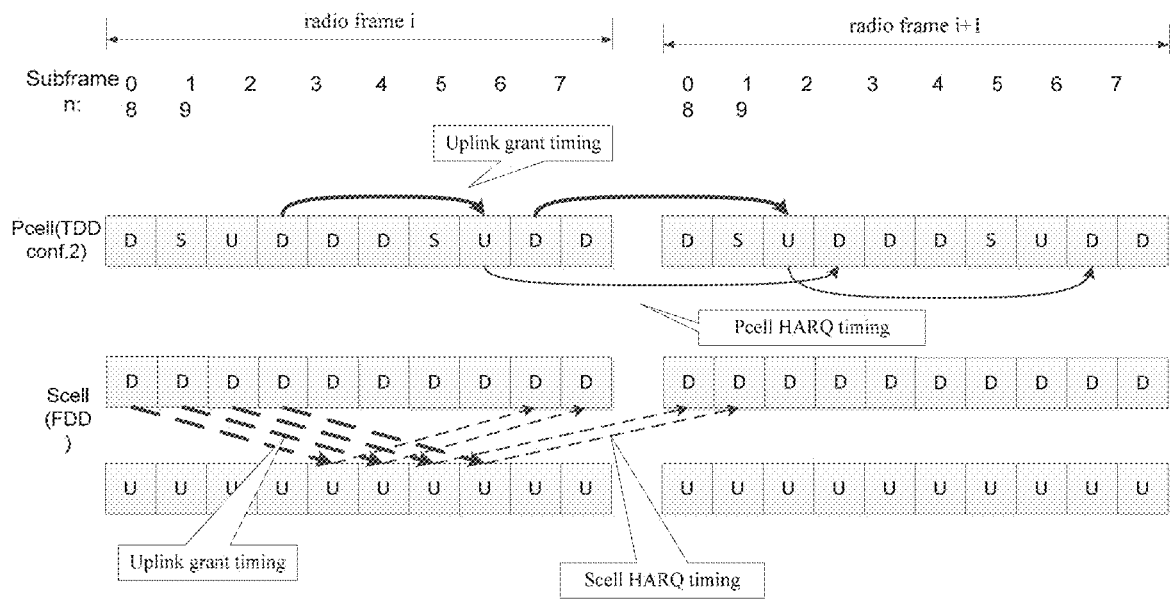
FIG. 14 illustrates the PDSCH HARQ timing for the Scell (FDD) in a case where the Pcell is configured as TDD and the Scell (FDD) is self scheduled according to the third solution of the present invention.
FIG. 15 illustrates a timing relationship among physical channels for use in a case where the serving cells are self scheduled, according to an exemplary embodiment of the present invention.

FIG. 14 illustrates the PDSCH HARQ timing for the Scell (FDD) in a case where the Pcell is configured as TDD and the Scell (FDD) is self scheduled according to the third solution of the present invention.

The UE receives the PDSCH transmitted by the eNB at an $(n-k)^{th}$ subframe and transmits an uplink HARQ ACK/NACK corresponding to the received PDSCH at an $n^{th}$ subframe. In other words, the HARQ ACK/NACK transmitted in subframe #n is associated with the PDSCHs received in subframe #n−k. Here, k denotes an element of a set K, and K is defined as shown in FIG. 14.

According to the third solution, since a new HARQ timing is defined, much more changes will be introduced into the existing specifications. However, high peak rate can be achieved, because all the FDD-CC DL subframes of the Scell can be used. In addition, the HARQ feedback delay can be kept low.

Above thus have discussed PDSCH HARQ timing for systems supporting CA of FDD and TDD. For a BS, it can transmit a DL physical channel (e.g., PDSCH) to a UE through one of the Pcell and Scell. Then, it can receive the HARQ feedback corresponding to the DL physical channel of the Pcell at a first timing predetermined for the Pcell. The BS can receive the HARQ feedback corresponding to the DL physical channel of the Scell at a second timing. The second timing is determined according one or more of the following factors: duplex modes of the Pcell and the Scell, a scheduling mode of the Scell, and predefined rules. The predefined rules may comprise that the HARQ feedback (e.g., carried by PUCCH) can only be transmitted on a component carrier of the Pcell.

When the Pcell is configured as FDD, the second timing is identical with the first timing for both self scheduling and cross carrier scheduling of the Scell.

When the Pcell is configured as TDD, the second timing is identical with the first timing for cross carrier scheduling of the Scell.

When the Pcell is configured as TDD and the Scell is configured as FDD, for self scheduling of the Scell, the second timing can be determined according to any one of the following: being identical with the first timing; being identical with a third timing for a TDD configuration which has more available DL subframes than the TDD configuration of the Pcell; and a fourth timing specific to the Scell.

The fourth timing can be designed according to the description of the third solution (Solution 3) with reference to FIGS. 12-14.

For a UE, it can receive a DL physical channel (e.g., PDCCH) from a BS through one of the Pcell and Scell. Then, it can transmit the HARQ feedback corresponding to the DL physical channel of the Pcell at a first timing predetermined for the Pcell. The UE can transmit the HARQ feedback corresponding to the DL physical channel of the Scell at a second timing.

HARQ-ACK/NACK Timing for Uplink Transmission

As mentioned above, the scenarios of CA of FDD and TDD can be classified according to scheduling modes. In the LTE-A systems supporting carrier aggregation, the scheduling mode can be selected from a self scheduling and a cross carrier scheduling. The Pcell can not be cross carrier scheduled by any Scell. A Scell can be cross carrier scheduled by the Pcell or another Scell. Since the PHICH which carriers downlink HARQ ACK/NACK feedback can be only transmitted on the component carrier which carriers the uplink grant (i.e., on PDCCH), in the following, description of downlink HARQ timing along with the uplink (PUSCH) scheduling will be given with respect to Scenario A (self scheduling) and Scenario B (cross carrier scheduling).

Scenario A

For Scenario A where the serving cells comprising the Pcell and at least one Scell are self scheduled, these serving cells, either configured as FDD or TDD, can just refer their own PUSCH scheduling and HARQ timing.

FIG. 15 illustrates a timing relationship among physical channels for use in a case where the serving cells are self scheduled, according to an exemplary embodiment of the present invention. In the example of FIG. 15, the Pcell is configured with TDD configuration #2, and the Scell is configured as FDD.

Referring to FIG. 15, the black bold lines indicate the uplink grant timing of Pcell, i.e., the PUSCH scheduling timing for TDD UL-DL configuration #2, which has been discussed with reference to FIG. 5. For example, upon detection a PDCCH/EPDCCH with DCI format 0/4 in subframe #3 intended for a UE, the UE will adjust the corresponding PUSCH transmission in subframe #7 in the current radio frame i; upon detection a PDCCH/EPDCCH with DCI format 0/4 in subframe #8 intended for the UE, the UE will adjust the corresponding PUSCH transmission in subframe #2 within the next radio frame i+1.

The bold dotted lines indicate the uplink grant timing of Scell. For example, upon detection a PDCCH/EPDCCH with DCI format 0/4 in subframe #n intended for the UE, the UE will adjust the corresponding PUSCH transmission in subframe #n+4.

In FIG. 15, the thin solid lines indicate the HARQ timing of the Pcell which refers its own HARQ timing according to one embodiment. For example, the UE transmits PUSCH in UL subframe #7 of the current radio frame i through the Pcell, and then the UE will receive the HARQ feedback corresponding to the transmitted PUSCH in DL subframe #3 of the next radio frame i+1 through the Pcell. If the UE transmits PUSCH in UL subframe #2 of the radio frame i+1, the UE will receive the HARQ feedback corresponding to the transmitted PUSCH in DL subframe #8 of the radio frame i+1 through the Pcell.

The thin dotted lines indicate the HARQ timing of the Scell (FDD) which refers its own HARQ timing according to one embodiment. For example, the UE transmits PUSCH in UL subframe #n, and then the UE will receive the HARQ feedback corresponding to the transmitted PUSCH in DL subframe #n+4.

Scenario B

For Scenario B where the serving cell is cross carrier scheduled, there are two cases. Case 1 is that a FDD-CC cell schedules a TDD-CC cell, and Case 2 is that a TDD-CC cell schedules a FDD-CC cell. In the following, terms "a scheduling cell" and "a scheduled cell" will be introduced. In cross carrier scheduling, a cell whose component carrier carries DCI for data transmission is a scheduling cell, and a cell whose component carrier carrying the data scheduled as indicated by the DCI is a scheduled cell.

The scheduling cell (regardless Pcell or Scell) can just refer its own scheduling and HARQ timing.

For a scheduled cell, different solutions may be adopted depending on the case the scheduled cell belongs to.

In Case 1 where the scheduled cell is configured as TDD and scheduled by a FDD-CC cell, the scheduled cell can just refer its own scheduling and HARQ timing. Since the scheduling cell (FDD) always has DL subframes in any specific time duration, the DL subframes of the scheduling cell can be used by the scheduled cell for HARQ ACK/NACK feedback corresponding to PUSCH transmission scheduled through the scheduling cell.

For Case 2 where the scheduled cell is configured as FDD and scheduled by a TDD-CC cell, the PDCCH/EPDCCH carrying scheduling information (e.g., uplink grant) is transmitted through the component carrier of the scheduling cell (TDD-CC), the PHICH carrying HARQ ACK/NACK corresponding to the scheduled PUSCH transmission should also be transmitted through the component carrier of the scheduling cell (TDD-CC). However, due to UL-DL configurations, the UL subframes of the scheduling cell cannot be used for HARQ feedback. There are two solutions to define the scheduling timing and HARQ timing for the scheduled cell.

Solution A

Solution A is that the scheduled cell (a Scell) refers the scheduling timing and HARQ timing of the scheduling cell (TDD-CC).

Similar to Solution 1 as discussed in section "HARQ ACK/NACK Timing for Downlink Transmission", Solution A has advantage in little impact to the existing specifications. However, since some uplink subframes of the scheduled cell are unavailable, the peak rate will be decreased.

Solution B

Solution B is that the scheduled cell refers the scheduling timing and HARQ timing of one TDD UL-DL configuration which can use more uplink subframes of the scheduled cell as much as possible. Similar to Solution 2 as discussed in section "HARQ ACK/NACK Timing for Downlink Transmission", Solution B also has advantage in little impact to the existing specifications. Moreover, Solution B can provide much more available uplink subframes compared with Solution A and thereby the peak rate is higher.

Figures 16, 17:
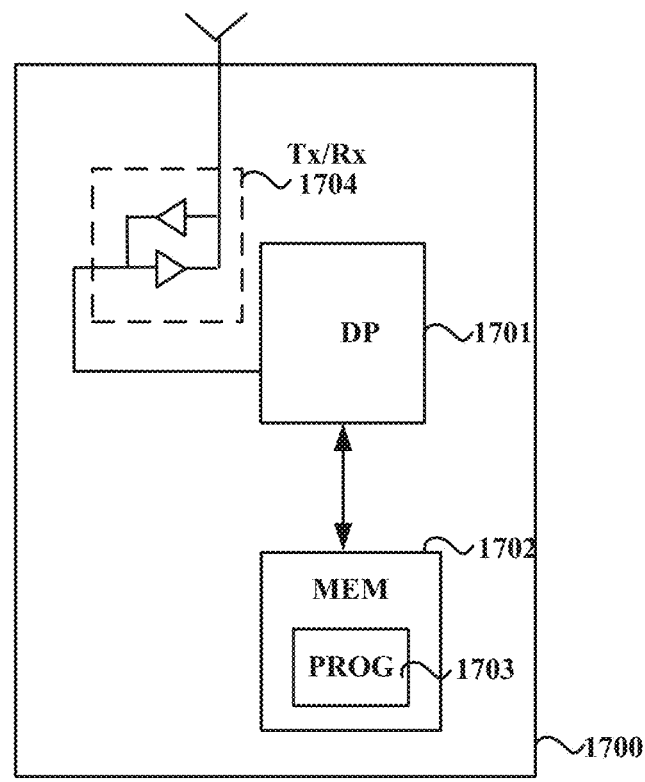
FIG. 16 shows a table for the number of available uplink subframes according to Solution B of embodiments of the present invention.
FIG. 17 illustrates a simplified block diagram of an entity that is suitable for use in practicing the exemplary embodiments of the present invention.

FIG. 16 shows a table for the number of available uplink subframes according to Solution B. The configuration referred by the scheduled cell may be represented as "reference configuration of Solution B".

In the table of FIG. 11, the first column is the TDD UL-DL configuration for the scheduling cell, and the second column is the TDD UL-DL configuration of the scheduled cell reference configuration. For the purpose of comparison, a third column is added to show the number of available uplink subframes for the scheduled cell according to Solution A. In the second column, the value in the parenthesis is the number of available UL subframes when a corresponding TDD UL-DL configuration is referenced by the scheduled cell.

For example, if the scheduling cell is configured with TDD configuration #3, then the scheduled cell (FDD) can refer the scheduling timing and HARQ timing of TDD configuration #0 or #6. The numbers of available UL subframes for the two configurations #0 and #0 are 6 and 5, respectively, each of which is greater than the number (3) of available UL subframes when referring the configuration of the scheduling cell (i.e., TDD configuration #3).

If the scheduled cell (FDD-CC) refers the scheduling and HARQ timing of TDD configuration #0, the PDCCH DCI format 0 and 4 will be transmitted following the TDD configuration #0. At this time, an UL index field is needed to schedule two uplink subframes in one downlink subframe.

Apparently, further solution can be provided for the scheduled cell. For example, a new scheduling timing and HARQ timing may be designed for the scheduled cell with reference to the design rules as discussed in section "HARQ ACK/NACK Timing for Downlink Transmission" with respect to Solution 3.

Above thus have discussed PUSCH scheduling timing and PUSCH HARQ timing for systems supporting CA of FDD and TDD. For a BS, it can receive an UL physical channel (e.g., PUSCH) from a UE through one of the Pcell and Scell. Then, it can transmit the HARQ feedback corresponding to the UL physical channel of the Pcell at a first timing predetermined for the Pcell. The BS can transmit the HARQ feedback corresponding to the UL physical channel of the Scell at a second timing. The second timing is determined according one or more of the following factors: duplex modes of the Pcell and the Scell, a scheduling mode of the Scell, and predefined rules. The predefined rules may comprise that the HARQ feedback (e.g., carried by PHICH) can only be transmitted on a component carrier which carries an uplink grant scheduling the PUSCH.

For self scheduling, the second timing is identical with a timing predetermined for the Scell.

For cross carrier scheduling, the second timing is further determined according to the duplex modes of a scheduling cell and a scheduled cell.

When the Scell is a scheduling cell, the second timing is identical with a timing predetermined for the Scell.

When the Scell is a scheduled cell which is configured as TDD and scheduled by a FDD component carrier cell, the second timing is identical with a timing predetermined for the Scell.

When the Scell is a scheduled cell which is configured as FDD and scheduled by a TDD component carrier cell, the second timing can be determined according to any one of the following: being identical with a timing of the scheduling cell; and being identical with a third timing for a TDD configuration which can use uplink subframes of the Scell as much as possible.

For a UE, it can transmit an UL physical channel (e.g., PUSCH) to a BS through one of the Pcell and Scell. Then, it can receive the HARQ feedback corresponding to the UL physical channel of the Pcell at a first timing predetermined for the Pcell. The UE can receive the HARQ feedback corresponding to the UL physical channel of the Scell at a second timing. The second timing is determined according to those solutions as described above.

FIG. 17 illustrates a simplified block diagram of an entity 1700 that is suitable for use in practicing exemplary embodiments of the present invention. The entity 1700 may be an entity at the network side, for example, a base station, or an entity at the user side, e.g., a user equipment.

As shown in FIG. 17 the entity 1700 includes a data processor (DP) 1701, a memory (MEM) 1702 coupled to the DP 1701, and a suitable RF transmitter TX and receiver RX 1704 coupled to the DP 1701. The MEM 1702 stores a program (PROG) 1703. The TX/RX 1704 is for bidirectional wireless communications. Note that the TX/RX 1704 has at least one antenna to facilitate communication, though in practice a BS or a UE may have several. The entity 1700 may be coupled via a data path to one or more external networks or systems, such as the internet, for example.

The PROG 1703 is assumed to include program instructions that, when executed by the associated DP 1701, enable the entity 1700 to operate in accordance with the exemplary embodiments of this invention.

The embodiments of the present invention may be implemented by computer software executable by the DP 1701 of the entity 1700, or by hardware, or by a combination of software and hardware.

The MEM 1702 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the entity 1700, there may be several physically distinct memory units in the entity 1700. The DP 1701 may be of any type suitable to the local technical environment, and may include one or more of general purpose computers, special purpose computers, microprocessors, digital signal processors (DSPs) and processors based on multicore processor architecture, as non limiting examples. The entity 1700 may have multiple processors, such as for example an application specific integrated circuit chip that is slaved in time to a clock which synchronizes the main processor.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method performed by a user equipment (UE) in a communication system supporting Carrier Aggregation (CA) of a primary cell and at least one secondary cell, the method comprising:
receiving a downlink physical channel from a base station within subframes n−k for one of the at least one secondary cell, where variables n and k are natural numbers; and
transmitting in subframe n, to the base station, a Hybrid Automatic Repeat Request (HARQ) feedback corresponding to the downlink physical channel,
wherein, in a case where the primary cell is configured as Time Division Duplex (TDD) and the one of the at least one secondary cell is configured as Frequency Division Duplex (FDD),
if the UE is configured to monitor a control channel in another cell for scheduling the one of the at least one secondary cell, candidate values expressed in variable k include values as shown below:
if the primary cell is configured with Uplink (UL)-Downlink (DL) configuration 0:
5 for n=2; 5 or 4 for n=3; 5 for n=7; and 5 or 4 for n=8,
if the primary cell is configured with UL-DL configuration 1:
5 for n=3; and 5 for n=8,
if the primary cell is configured with UL-DL configuration 2:
5 for n=2; and 5 for n=7,
if the primary cell is configured with UL-DL configuration 3:
10, 9, or 8 for n=2,
if the primary cell is configured with UL-DL configuration 4:
10 or 9 for n=2,
if the primary cell is configured with UL-DL configuration 5:
10 for n=2, and
if the primary cell is configured with UL-DL configuration 6:
8 for n=2; 6 for n=3; 6 for n=4; and 6 or 5 for n=8.

2. The method of claim 1, wherein a frame structure of the UL-DL configuration is defined as shown below:

| UL-DL configuration | Subframe number | | | | | | | | | |
|---|---|---|---|---|---|---|---|---|---|---|
|  | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

3. The method of claim 1, wherein,
if the UE is configured to monitor the control channel in another cell for scheduling the one of the at least one secondary cell, and if the primary cell is configured with UL-DL configuration 0,
the candidate values k include values as shown below:

| Subframe n | | | | | | | | | |
|---|---|---|---|---|---|---|---|---|---|
| 0 | 1 | 2 | 3 | 4 | 5 | 6 | 7 | 8 | 9 |
| — | — | 6, 5 | 5, 4 | 4 | — | — | 6, 5 | 5, 4 | 4 |

4. The method of claim 1, wherein,
if the UE is configured to monitor the control channel in another cell for scheduling the one of the at least one secondary cell, and if the primary cell is configured with UL-DL configuration 2, the candidate values k include values as shown below:

| Subframe n | | | | | | | | | |
|---|---|---|---|---|---|---|---|---|---|
| 0 | 1 | 2 | 3 | 4 | 5 | 6 | 7 | 8 | 9 |
| — | — | 8, 7, 6, 5, 4 | — | — | — | — | 8, 7, 6, 5, 4 | — | — |

5. The method of claim 1, wherein,
if the UE is configured to monitor the control channel in another cell for scheduling the one of the at least one secondary cell, and if the primary cell is configured with UL-DL configuration 5,
the candidate values k include values as shown below:

| Subframe n | | | | | | | | | |
|---|---|---|---|---|---|---|---|---|---|
| 0 | 1 | 2 | 3 | 4 | 5 | 6 | 7 | 8 | 9 |
| — | — | 13, 12, 11, 10, 9, 8, 7, 6, 5, 4 | — | — | — | — | — | — | — |

6. The method of claim 1, wherein,
within one UL-DL configuration with which the primary cell is configured,
a number of downlink subframes in which the downlink physical channel of the one of the at least one secondary cell is received, per an uplink subframe of the primary cell in which the HARQ feedback corresponding to the downlink physical channel is transmitted, is equal to a roundness of a number of downlink subframes in which the downlink physical channel of the one of the at least one secondary cell is received divided by the number of the uplink subframes of the primary cell in which the HARQ feedback corresponding to the downlink physical channel is transmitted.

7. A method performed by a base station in a communication system supporting Carrier Aggregation (CA) of a primary cell and at least one secondary cell, the method comprising:
- transmitting a downlink physical channel to a user equipment (UE) within subframes n−k for one of the at least one secondary cell, where variables n and k are natural numbers; and
- receiving in subframe n, from the UE, a Hybrid Automatic Repeat Request (HARQ) feedback corresponding to the downlink physical channel,
- wherein, in a case where the primary cell is configured as Time Division Duplex (TDD) and the one of the at least one secondary cell is configured as Frequency Division Duplex (FDD),
- if the UE is configured to monitor a control channel in another cell for scheduling the one of the at least one secondary cell, candidate values expressed in variable k include values as shown below:
  - if the primary cell is configured with Uplink (UL)-Downlink (DL) configuration 0:
    - 5 for n=2; 5 or 4 for n=3; 5 for n=7; and 5 or 4 for n=8,
  - if the primary cell is configured with UL-DL configuration 1:
    - 5 for n=3; and 5 for n=8,
  - if the primary cell is configured with UL-DL configuration 2:
    - 5 for n=2; and 5 for n=7,
  - if the primary cell is configured with UL-DL configuration 3:
    - 10, 9, or 8 for n=2,
  - if the primary cell is configured with UL-DL configuration 4:
    - 10 or 9 for n=2,
  - if the primary cell is configured with UL-DL configuration 5:
    - 10 for n=2, and
  - if the primary cell is configured with UL-DL configuration 6:
    - 8 for n=2; 6 for n=3; 6 for n=4; and 6 or 5 for n=8.

8. The method of claim 7, wherein a frame structure of the UL-DL configuration is defined as shown below:

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

9. The method of claim 7, wherein,
if the UE is configured to monitor the control channel in another cell for scheduling the one of the at least one secondary cell, and if the primary cell is configured with UL-DL configuration 0,
the candidate values k include values as shown below:

| Subframe n | | | | | | | | | | |
|---|---|---|---|---|---|---|---|---|---|---|
| 0 | 1 | 2 | 3 | 4 | 5 | 6 | 7 | 8 | 9 |
| — | — | 6, 5 | 5, 4 | 4 | — | — | 6, 5 | 5, 4 | 4 |

10. The method of claim 7, wherein,
if the UE is configured to monitor the control channel in another cell for scheduling the one of the at least one secondary cell, and if the primary cell is configured with UL-DL configuration 2,
the candidate values k include values as shown below:

| Subframe n | | | | | | | | | | |
|---|---|---|---|---|---|---|---|---|---|---|
| 0 | 1 | 2 | 3 | 4 | 5 | 6 | 7 | 8 | 9 |
| — | — | 8, 7, 6, 5, 4 | — | — | — | — | 8, 7, 6, 5, 4 | — | — |

11. The method of claim 7, wherein,
if the UE is configured to monitor the control channel in another cell for scheduling the one of the at least one secondary cell, and if the primary cell is configured with UL-DL configuration 5,
the candidate values k include values as shown below:

| Subframe n | | | | | | | | | | |
|---|---|---|---|---|---|---|---|---|---|---|
| 0 | 1 | 2 | 3 | 4 | 5 | 6 | 7 | 8 | 9 |
| — | — | 13, 12, 11, 10, 9, 8, 7, 6, 5, 4 | — | — | — | — | — | — | — |

12. The method of claim 7, wherein,
within one UL-DL configuration with which the primary cell is configured,
a number of downlink subframes in which the downlink physical channel of the one of the at least one secondary cell is transmitted, per an uplink subframe of the primary cell in which the HARQ feedback corresponding to the downlink physical channel is received, is equal to a roundness of a number of downlink subframes in which the downlink physical channel of the one of the at least one secondary cell is transmitted divided by the number of the uplink subframes of the primary cell in which the HARQ feedback corresponding to the downlink physical channel is received.

13. A user equipment (UE) in a communication system supporting Carrier Aggregation (CA) of a primary cell and at least one secondary cell, the UE comprising a transceiver; and a processor configured to control the transceiver to:
- receive a downlink physical channel from a base station within subframes n−k for one of the at least one secondary cell, where variables n and k are natural numbers; and
- transmit in subframe n, to the base station, a Hybrid Automatic Repeat Request (HARQ) feedback corresponding to the downlink physical channel,
- wherein, in a case where the primary cell is configured as Time Division Duplex (TDD) and the one of the at least one secondary cell is configured as Frequency Division Duplex (FDD),
- if the UE is configured to monitor a control channel in another cell for scheduling the one of the at least one secondary cell, candidate values expressed in variable k include values as shown below:

if the primary cell is configured with Uplink (UL)-Downlink (DL) configuration 0:
  5 for n=2; 5 or 4 for n=3; 5 for n=7; and 5 or 4 for n=8,
if the primary cell is configured with UL-DL configuration 1:
  5 for n=3; and 5 for n=8,
if the primary cell is configured with UL-DL configuration 2:
  5 for n=2; and 5 for n=7,
if the primary cell is configured with UL-DL configuration 3:
  10, 9, or 8 for n=2,
if the primary cell is configured with UL-DL configuration 4:
  10 or 9 for n=2,
if the primary cell is configured with UL-DL configuration 5:
  10 for n=2, and
if the primary cell is configured with UL-DL configuration 6:
  8 for n=2; 6 for n=3; 6 for n=4; and 6 or 5 for n=8.

14. The UE of claim 13, wherein a frame structure of the UL-DL configuration is defined as follows:

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

15. The UE of claim 13, wherein,
if the UE is configured to monitor the control channel in another cell for scheduling the one of the at least one secondary cell, and if the primary cell is configured with UL-DL configuration 0,
the candidate values k include values as shown below:

| Subframe n | | | | | | | | | |
|---|---|---|---|---|---|---|---|---|---|
| 0 | 1 | 2 | 3 | 4 | 5 | 6 | 7 | 8 | 9 |
| — | — | 6, 5 | 5, 4 | 4 | — | — | 6, 5 | 5, 4 | 4 |

16. The UE of claim 13, wherein,
if the UE is configured to monitor the control channel in another cell for scheduling the one of the at least one secondary cell, and if the primary cell is configured with UL-DL configuration 2,
the candidate values k include values as shown below:

| Subframe n | | | | | | | | | |
|---|---|---|---|---|---|---|---|---|---|
| 0 | 1 | 2 | 3 | 4 | 5 | 6 | 7 | 8 | 9 |
| — | — | 8, 7, 6, 5, 4 | — | — | — | — | 8, 7, 6, 5, 4 | — | — |

17. The UE of claim 13, wherein,
if the UE is configured to monitor the control channel in another cell for scheduling the one of the at least one secondary cell, and if the primary cell is configured with UL-DL configuration 5,
the candidate values k include values as shown below:

| Subframe n | | | | | | | | | |
|---|---|---|---|---|---|---|---|---|---|
| 0 | 1 | 2 | 3 | 4 | 5 | 6 | 7 | 8 | 9 |
| — | — | 13, 12, 11, 10, 9, 8, 7, 6, 5, 4 | — | — | — | — | — | — | — |

18. The UE of claim 13, wherein,
within one UL-DL configuration with which the primary cell is configured,
a number of downlink subframes in which the downlink physical channel of the one of the at least one secondary cell is received, per an uplink subframe of the primary cell in which the HARQ feedback corresponding to the downlink physical channel is transmitted, is equal to a roundness of a number of downlink subframes in which the downlink physical channel of the one of the at least one secondary cell is received divided by the number of the uplink subframes of the primary cell in which the HARQ feedback corresponding to the downlink physical channel is transmitted.

* * * * *